United States Patent [19]

Corry et al.

[11] Patent Number: 5,541,867
[45] Date of Patent: Jul. 30, 1996

[54] METHOD AND APPARATUS FOR DECORRELATION OF MUTUALLY CONTAMINATED DIGITAL SIGNALS

[75] Inventors: Alan G. Corry, Santa Clara; Manoj Puri, Fremont; Robert A. Sutherland, San Jose, all of Calif.

[73] Assignee: MicroUnity Systems Engineering, Inc., Sunnyvale, Calif.

[21] Appl. No.: 377,424

[22] Filed: Jan. 24, 1995

[51] Int. Cl.$^6$ .................................................. G06F 17/15
[52] U.S. Cl. .................. 364/724.19; 364/728.03
[58] Field of Search .................. 364/724.19, 724.07, 364/724.01, 728.03

[56] References Cited

U.S. PATENT DOCUMENTS

| | | | |
|---|---|---|---|
| 4,649,505 | 3/1987 | Zinser, Jr. et al. | 364/724.19 |
| 4,760,540 | 7/1988 | Yuen | 364/724.19 |
| 4,941,117 | 7/1990 | Yuen | 364/724.01 |
| 5,309,378 | 5/1994 | Beierle | 364/724.19 |

OTHER PUBLICATIONS

Orfanidis, *Optimum Signal Processing—An Introduction*, MacMillan, pp. 404–411 (1988).
Widrow et al, *Adaptive Signal Processing*, Prentice Hall, pp. 302–317 (1985).

*Primary Examiner*—David H. Malzahn
*Attorney, Agent, or Firm*—Burns, Doane, Swecker & Mathis

[57] ABSTRACT

An apparatus and method for decorrelating pairs of mutually contaminated channels in a multi-channel digital signal including two identical data processing paths and a feedback path. Each pair of mutually contaminated channels consists of a first contaminated channel and a second contaminated channel. Initially, first and second shined signals are generated by shifting the original contaminated signal such that the first shined signal has the first contaminated channel centered at zero frequency and the second shined signal has the second contaminated channel centered at zero frequency. Each of the first and second shifted signals are coupled to one of the two identical signal processing paths. The first path generates an error corruption component corresponding to the first shifted input signal and subtracts this corruption component from the second shifted signal in order to generate a third decorrelated digital signal. The second path generates an error corruption component corresponding to the second shined input signal and subtracts it from the first shifted signal in order to generate a fourth decorrelated digital signal. The feedback path generates a current average error correlation factor by multiplying the third and fourth to generate an instantaneous error factor and summing this with the previous average error correlation factor for all samples. The current average error correlation factor is used to generate the first and second error corruption components. Each of the corrupted channels in the original contaminated digital signal are decorrelated when the third and rough digital signals are decorrelated.

12 Claims, 5 Drawing Sheets

METHOD AND APPARATUS FOR DECORRELATION OF MUTUALLY CONTAMINATED DIGITAL SIGNALS

FIELD OF THE INVENTION

The present invention relates to the field of digital signal processing and particularly to decorrelating digital signals.

BACKGROUND OF THE INVENTION

Figure 1:
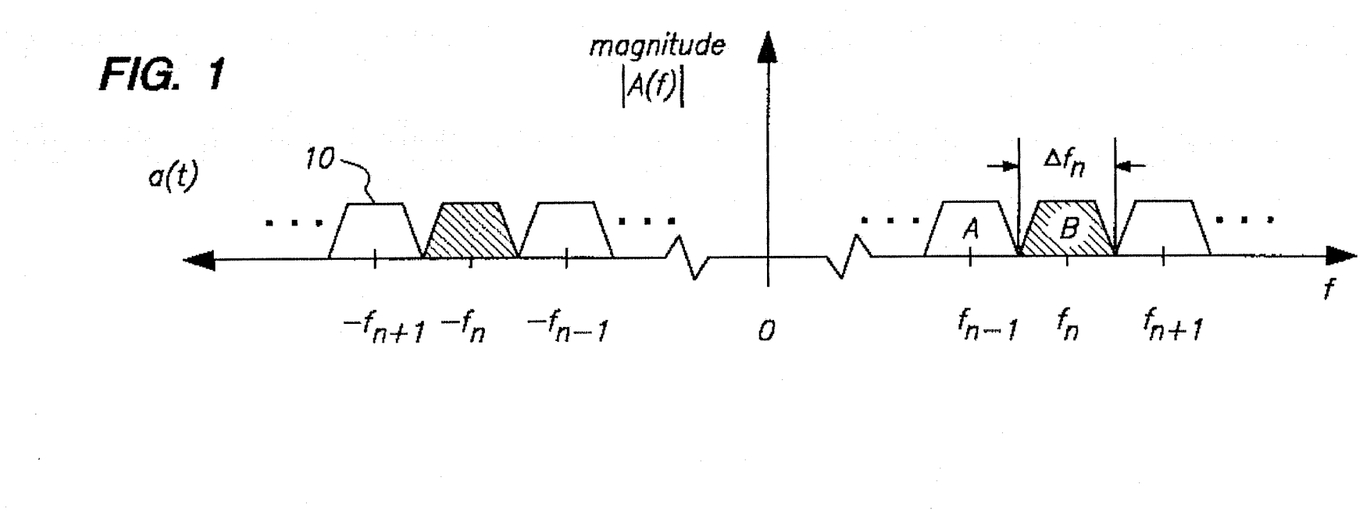
FIG. 1 illustrates a multi-channel complex analog signal a(t).

In the field of communications, information is often encoded into a large spectrum of analog signals and transmitted to receivers where the information is subsequently extracted. The spectrum typically is made up of many channels, each channel carrying a distinct envelope of information. A channel is defined as a group of frequencies having a certain bandwidth ($b_0$) that are centered about a center frequency ($f_0$). FIG. 1 illustrates a typical signal a(t) having many channels 10. Once the spectrum of signals is transmitted, a channel is selected and isolated so that the encoded information within the channel may be extracted.

One manner of implementing a receiver for selection of a particular channel (also referred to as the channel of interest) is to first shift a(t) such that the center frequency of the channel of interest is centered at a first intermediate frequency $f_{i1}$. Next, the shifted signal a(t) is passed through an analog filter which isolates several channels (including the channel of interest and other unselected channels) from signal a(t). The signal resulting from this step is then shifted again to a second intermediate frequency $f_{i2}$ by a complex mixer.

The complex mixer generates an analog signal having real (I) and imaginary (Q) components, each component having the channel of interest centered at $f_{i2}$. In order to generate this complex signal, the complex mixer is implemented with two matched mixers; one for generating the real shifted component and one for generating the imaginary shifted component.

Each of the real and imaginary components of the complex signal generated by the mixer is coupled to one of a pair of matched analog-to-digital (ND) converters which function to convert the real and imaginary components of the complex analog signal into real and imaginary components of a complex digital signal.

At this point in signal processing, it is desired to perform a final digital filtering step so that the channel of interest may be isolated from the rest of the unselected channels. However, due to mismatches in components in the imaginary and real signal processing paths of the analog mixers and ND converters in the above implementation of the receiver, each of the channels (including the channel of interest) in the complex digital signal has been contaminated by the other. For instance, the digital signal representing the channel of interest constitutes an uncontaminated component and an error component associated with the other unselected channels. Similarly, the digital signal representing each of the unselected channels has an uncontaminated component and an error component associated with all of the other channels (including the channel of interest). Consequently, if the complex digital signal is passed through a digital filter to isolate the channel of interest, the information decoded from the channel of interest would be inaccurate since it includes information from other adjacent channels.

One common prior art filter (referred to as a Weiner filter) used for overcoming contamination problems functions to remove (or decorrelate) a contaminating signal from a contaminated signal. Generally, the Weiner filter functions such that given a contaminated signal and the signal that contaminated it (i.e. the contaminating signal), the Weiner filter estimates how much of the contaminating signal is in the contaminated signal and subtracts exactly that amount leaving only the desired decorrelated signal. The Weiner-type of filter is only effective if the original contaminating signal is known and is not contaminated by any other signal.

In the receiving method described above in which a signal having multiple channels is passed through a series of filters, mixers and ND convertors, each channel contaminates the other. Thus, the contaminating channel is not known since it too is contaminated. As a result, the Weiner filter becomes ineffective since it requires that the original contaminating signal be known. Consequently, what is needed is a method of decorrelating a signal having two mutually contaminated channels.

SUMMARY OF THE INVENTION

The present invention is an apparatus and method for decorrelating mutually contaminated channels in a multiple channel digital signal. In one embodiment of the present invention, the digital contaminated signal p[n] has a pair of mutually contaminated channels. The first contaminated channel comprises a first component corresponding to the uncontaminated first channel plus a second error component corresponding to the second channel. The second contaminated channel comprises a first component corresponding to the uncontaminated second channel plus a second error component corresponding to the first channel. The present invention decorrelates the first and second contaminated channels of the original digital signal p[n] to determine the unknown uncontaminated signals corresponding to each of the first and second channels. In another embodiment, multiple channel signal p[n] may also include more than one pair of mutually contaminated signals. In this case, the present invention functions to decorrelate each of the pairs of mutually contaminated signals.

A first embodiment of the apparatus of the present invention includes first and second identical data processing paths and a feedback path. The first path generates a first signal E[n] that comprises the uncontaminated first and second channels where the first channel is centered about zero frequency. The second path generates a second signal J[n] that comprises the uncontaminated first and second channels where the second channel is centered about zero frequency. The feedback path generates a variable average error correlation factor W[n] that is updated at the sample rate.

Initially, the original corrupted digital signal p[n] is frequency shifted by first and second digital mixers to generate two signals, X[n] and Y[n]. Signal X[n] is generated by shifting the original signal p[n] such that the first contaminated channel is centered about zero frequency. Signal Y[n] is generated by shifting the original signal p[n] such that the second contaminated channel is centered about zero frequency. Signals Y[n] and X[n] are coupled to each of the first and second identical data processing paths, respectively.

The first signal processing path includes a first means for negating the phase of Y[n] to generate a signal Y[n]*. The output of the phase negating means is coupled to a first digital multiplier for multiplying signal Y[n]* with the current average error correlation factor W[n]. The output of the multiplier is coupled to a first digital adder. The first digital adder generates a signal E[n]' by subtracting the product (Y[n]*)×(W[n]) from signal X[n] for each of the current W[n]. The subtraction step is continuously performed for each new W[n] until E[n]'=E[n] where signal E[n] corresponds to a signal comprised of the uncontaminated first and second channels, where the first channel is centered about zero frequency.

The second signal processing path includes a second means for negating the phase of X[n] to generate a signal X[n]*. The output of the phase negating means is coupled to a second digital multiplier for multiplying signal X[n]* with the current average error correlation factor W[n]. The output of the second multiplier is coupled to a second digital adder. The digital adder generates a signal J[n]' by subtracting the product of (X[n]*)×(W[n]) from signal Y[n] for each of the current W[n]. The subtraction step is continuously performed for each new current average error correlation factor until J[n]'=J[n] where signal J[n] corresponds to a signal comprising the uncontaminated first and second channels, where the second channel is centered about zero frequency.

The feedback path includes a third digital multiplier for multiplying signals E[n]' and J[n]' to generate a current instantaneous error correlation factor. In addition, the feedback path includes a means for averaging all of the instantaneous error correlation factors for all samples to generate the current averaged error correlation factor. In one embodiment, the digital averaging means includes a digital adding means and a delay means which function to add the previous instantaneous error correlation factor with the current instantaneous correlation factor to generate the current averaged correlation factor. The current averaged error correlation factor is generated as long as the current instantaneous error correlation factor is non-zero. In the ideal case, when the instantaneous error correlation factor is zero, the channels are completely decorrelated.

In a variation of the above described embodiment of the present invention, the current instantaneous error correlation factor is weighted by multiplying the product of E[n]' and J[n]' with weighting factor (2μ). The magnitude of the weighting factor determines the speed at which the contaminated channels are decorrelated from each other.

In another embodiment, the original contaminated signal p[n] does not require shifting. Instead, signal p[n] is directly coupled to a phase negating means to generated a signal p[n]*. The output of the phase negating means is coupled to a first digital multiplier which multiplies p[n]* with the current averaged error correlation factor W[n]. The product of this multiplication is coupled to a first digital adder which subtracts this product from contaminated signal p[n] to generate E[n]'. The subtraction step is continuously performed for each current averaged error correlation factor until E[n]'=E[n] where signal E[n] corresponds to the two uncontaminated channels.

The current average error correlation factor W[n] for the above embodiment is generated by a feedback path which includes a second digital multiplier for multiplying signal E[n]' with itself to generate a current instantaneous error correlation factor. The feedback loop also includes a means for averaging the instantaneous error correlation factor for all samples. In one embodiment, the means for averaging the instantaneous error correlation factor comprises a digital adding means and a delay, means that function to add the previous instantaneous error correlation factor with the current error correlation factor to generate the current average error correlation factor.

In a variation of this embodiment of the present invention, the current instantaneous error correlation factor is weighted by multiplying the product E[n]'² with weighting factor (2μ). The magnitude of the weighting factor determines the speed at which the contaminated channels in signal p[n] are decorrelated.

DETAILED DESCRIPTION

An apparatus and method for decorrelating mutually contaminated signals is described. In the following description, numerous specific details are set forth, such as specific system architectures and signal processing methods, etc., in order to provide a thorough understanding of the present invention. It will be obvious, however, to one skilled in the art that these specific details need not be employed to practice the present invention. In other instances, well-known signal processing components and methods have not been described in detail in order to avoid unnecessarily obscuring the present invention.

Figure 2:
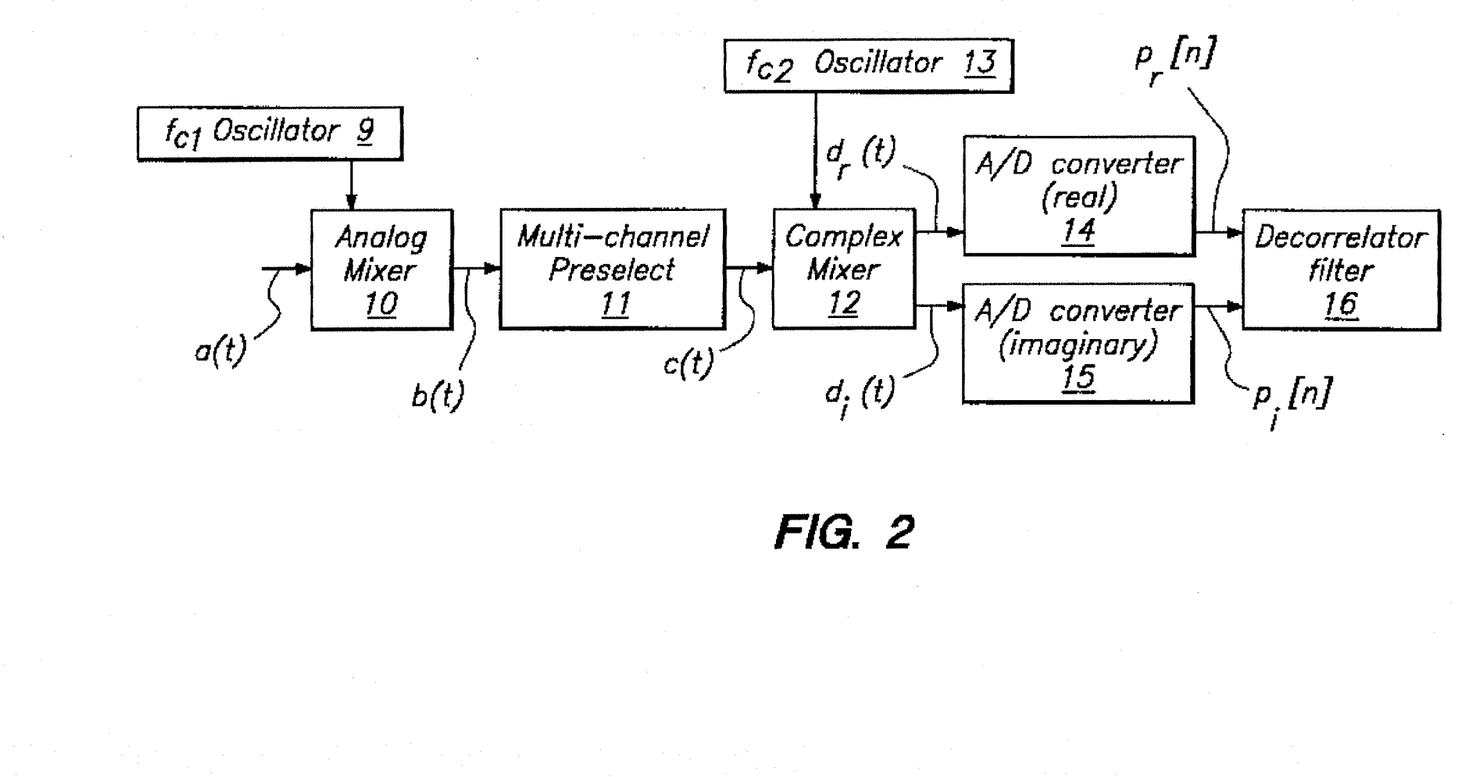
FIG. 2 illustrates the basic stages of a receiver.

FIG. 2 illustrates the basic stages of a signal receiver for processing an input analog signal a(t) (FIG. 1 ). Generally, in the field of communications, signal a(t) comprises a collection of analog channels, each channel having some center frequency and a corresponding bandwidth. For example, channel B, (the channel of interest) has a center frequency fn and a bandwidth $\Delta f_n$ as shown in FIG. 1.

Signal a(t) is coupled to the input of analog mixer 10 (FIG. 2). Mixer 10 shifts signal a(t) so that the channel of interest having center frequency $f_n$ is centered at some intermediate frequency $f_{i1}$, (where $f_{i1}$ is some frequency less than $f_n$). Mixer 10 utilizes carrier frequency $f_{c1}$ to perform the mixing operation. As shown in FIG. 2, carrier frequency $f_{c1}$, generated by oscillator 9, is coupled to mixing unit 10 along with input signal a(t). Unit 10 outputs a signal b(t) having the channel of interest centered at $f_{i1}$.

Signal b(t) is coupled to a multi-channel preselect unit 11. Preselect unit 11 performs an initial filtering step and outputs an analog signal c(t) which includes the channel of interest B and an adjacent unselected channel A, where channel B is centered at $f_{i1}$.

Figure 3:
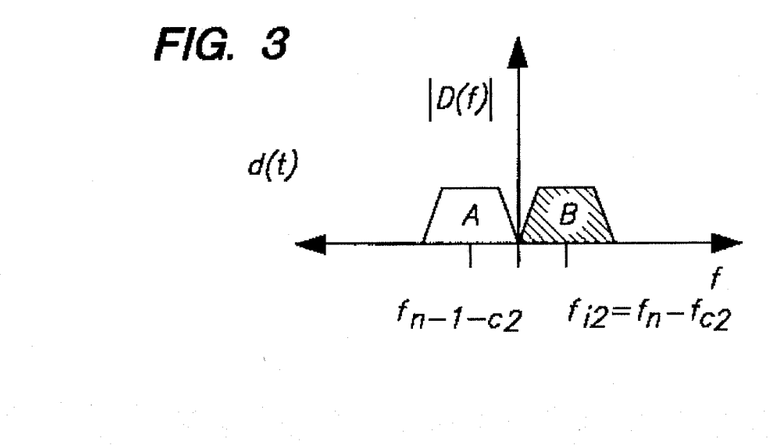
FIG. 3 illustrates the multi-channel complex signal shown in FIG. 1 after it has been mixed and preselected by units 10, 11 and 12.

The output of the preselect unit 11 is coupled to the input of complex mixer 12 (FIG. 2). Complex mixer 12 shifts the analog signal which comprises channels A and B such that channel B is centered to a new intermediate frequency $f_{i2}$, (where $f_{i2}$ is chosen to be close to zero frequency). Mixing to a frequency close to zero is performed in order to make practical the subsequent step of preselection and A/D conversion. Mixer 12 utilizes carrier frequency $f_{c2}$ to perform the mixing operation. As shown in FIG. 2, carrier frequency $f_{c2}$, generated by oscillator 13, is coupled to mixing unit 12 along with signal c(t) from unit 11. Since mixer unit 12 is a complex mixer, it outputs an analog signal d(t) having a real component $d(t)_r$ and imaginary component $d(t)_i$. Signal d(t) is an analog signal comprising channels A and B where channel B is centered at $f_{i2}$, as shown in FIG. 3.

Each of the analog real and imaginary components of d(t) are converted to digital form by analog-to-digital (A/D) converters 14 and 15. A/D converters 14 and 15, perform the conversions by taking discrete samples of the real and imaginary components of signal d(t) at a specific rate to generate p[n]. Signal p[n] comprises both real and imaginary components $p_r[n]$ and $p_i[n]$. Signal p[n] is expressed in polar vector form as follows:

$$p[n]=A[n]e^{-j\omega n}+B[n]e^{j\omega n} \qquad \text{eq. 1}$$

where contaminated channel A is represented by signal A[n] and contaminated channel B is represented by B[n].

As described above, due to previous signal processing steps, channels A and B are mutually contaminated by the other. Consequently, signal A[n] has a first component a[n] corresponding to uncontaminated channel A and a second error component W × b[n] corresponding to channel B. Similarly, signal B[n] has a first component b[n] corresponding to uncontaminated channel B and a second error component W × a[n] corresponding to channel A. Signals A[n] and B[n] are shown below.

$$A[n]=a[n]+(W\times b[n]) \qquad \text{eq. 2}$$

$$B[n]=b[n]+(W\times a[n]) \qquad \text{eq. 3}$$

where W represents gain and phase imbalances between components in complex mixer 12 and A/D converters 14 and 15.

The present invention is a method and apparatus that functions to decorrelate the error factor W×b[n] from channel A as well as decorrelate the error factor W×a[n] from channel B.

Figure 4:
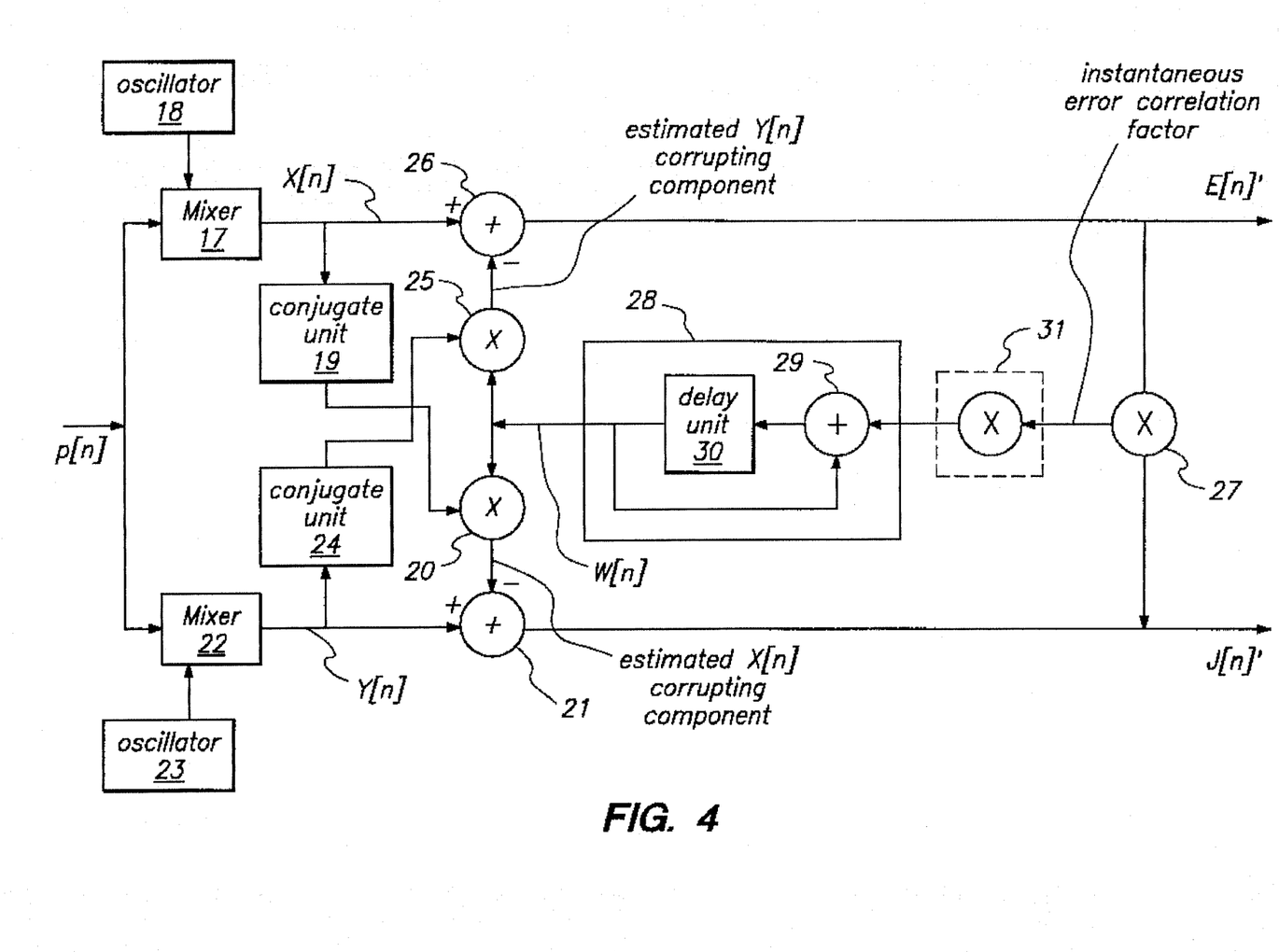
FIG. 4 illustrates a first embodiment of the present invention for decorrelating a two-channel digital signal having first and second contaminated channels.

FIG. 4 illustrates the first embodiment of the present invention which functions to decorrelate a signal p[n] (shown in FIG. 5A) having two mutually corrupted channel signals A and B, where B is the channel of interest. Although p[n] is shown having only one pair of mutually contaminated signals, p[n] may also include more than one pair of mutually contaminated signals.

FIG. 4 illustrates a firm signal processing path including first mixer 17, first oscillator 18, first phase negating means 19, first digital multiplier 20, and first digital adder 21 and a second signal processing path including second mixer 22, second oscillator 23, second phase negating means 24, second digital multiplier 25, and second digital adder 26. FIG. 4 also include a feedback path having a third digital multiplier 27, and a digital integrator 28 comprising a third digital adder 29 and a delay unit 30.

Initially, signal p[n] is coupled to each of mixers 17 and 22. Mixer 17 functions to shift signal p[n] such that corrupted channel A is centered at zero frequency, i.e. DC, as shown in FIG. 5B. Oscillator 18 provides the given carrier frequency to enable mixer 17 to shift signal p[n] such that corrupted channel A is centered at zero frequency. The output of mixer 17 is a signal X[n] represented by equation 4. Mixer 22 functions to shift signal p[n] such that corrupted channel El is centered at zero frequency, as shown in FIG. 5C. Oscillator 23 provides the given carrier frequency to enable mixer 22 to shift signal p[n] such that corrupted channel El is centered at zero frequency. The output of mixer 22 is a signal Y[n] represented by equation 5.

$$X[n]=p[n]e^{-j\omega n} \qquad \text{eq. 4}$$

$$Y[n]=p[n]e^{j\omega n} \qquad \text{eq. 5}$$

Signal X[n] is coupled to the first phase negating means 19. In mathematical terms, phase negating means 19 takes the complex conjugate of signal X[n] and generates the signal shown below:

$$X[n]^*=p[n]^*e^{j\omega n} \qquad \text{eq.}$$

Similarly, signal Y[n] is coupled to the second phase negating means 24 and generates the signal shown below:

$$Y[n]^*=p[n]^*e^{-j\omega n} \qquad \text{eq.}$$

Signal X[n]* is coupled to a first digital multiplier 20 and is multiplied with the current average error correlation factor W[n] to generate an estimated X[n] corrupting component as shown below in equation 7. Error factor W[n] is generated by the feedback path and will be described in detail below.

$$\text{estimated } X[n] \text{ corrupting component}=X[n]^*\times W[n] \qquad \text{eq. 7}$$

As shown in FIG. 4, second digital multiplier 25 multiplies Y[n]* with W[n] to generate the estimated Y[n] corrupting component as shown below by equation 8.

$$\text{estimated } Y[n] \text{ corrupting component}=Y[n]^*\times W[n] \qquad \text{eq. 8}$$

The estimated X[n] and Y[n] corrupting components are subtracted from each of their corresponding corrupted signals Y[n] and X[n] (respectively) to produce signals J[n]' and E[n]' (respectively). First and second digital adders 21 and 26 perform the digital subtraction steps. As shown in FIG. 4, the product of multiplier 20 (i.e. estimated X[n] error corrupting component) is coupled to digital adder 21 along with signal Y[n]. FIG. 4 also shows the product of multiplier 25 (i.e. estimated Y[n] error corrupting component) being coupled to digital adder 26 along with signal X[n]. Equations 9 and 10 mathematically show the processing steps being performed by first and second digital adders 21 and 26.

$$J[n]'=Y[n]-X[n]^*\times W[n] \qquad \text{eq. 9}$$

$$E[n]'=X[n]-Y[n]^*\times W[n] \qquad \text{eq. 10}$$

where E[n]'=E[n] and J[n]'=J[n] when channels A and B are mutually decorrelated from each other. Decorrelated signals E[n] and J[n] are illustrated in FIGS. 4D and 4E. Referring to FIG. 5D, signal E[n] has two uncorrupted channels a and b, where a is centered at the zero frequency. Similarly, FIG. 5E illustrates signal J[n] having two uncorrupted channels a and b, where b is centered at zero frequency. In subsequent processing steps, unselected channel a is typically filtered out leaving only the channel of interest, i.e. channel b. Once channel b is isolated, further signal processing steps may be performed in order to extract the information encoded in the channel. For instance, if the channel is represented by a frequency modulated (FM) signal, the signal corresponding to channel b is passed through a digital FM demodulator to determine phase change information.

The current average error correlation factor W[n] is generated by first multiplying the current E[n]' and J[n]' signals together with digital multiplier 27 (FIG. 4) to generate an instantaneous error correlation factor. The output of multiplier 27 is coupled to digital integrator 28 which functions to sum the instantaneous error correlation factor with the previous average error correlation factor (i.e. W[n–1] to generate the current average error correlation factor (i.e. W[n]). In one embodiment of the present invention, digital integrator 28 is implemented with digital adder 29 and delay unit 30 as shown in FIG. 4. Delay unit 30 functions to delay the current average error correlation factor by one sample delay.

In another embodiment of the present invention, the instantaneous error correlation factor is fractionally weighted so that the estimated error corruption components converge on the actual error corruption component value at an incremental rate. As a result, the estimated value tends not to overshoot the actual value. The weighting function of the present invention is implemented by multiplying the instantaneous error correlation factor by a weighting factor $2\mu$, where $\mu<0$. FIG. 4 illustrates digital multiply unit 31 for multiplying a weighting factor $2\mu$ with the instantaneous error correlation factor. Unit 31 is shown in a dashed lined box to indicate it is not a necessary element for the embodiment of the present invention shown in FIG. 4. Instead, it provides an alternative implementation of this embodiment.

The apparatus shown in FIG. 4 functions such that current estimated X[n] and Y[n] error corruption components are determined for each current W[n] generated. The error corruption components are subtracted from the corresponding corrupted signals until each of the E[n] and J[n] signals are decorrelated.

Figures 6, 7A, 7B:
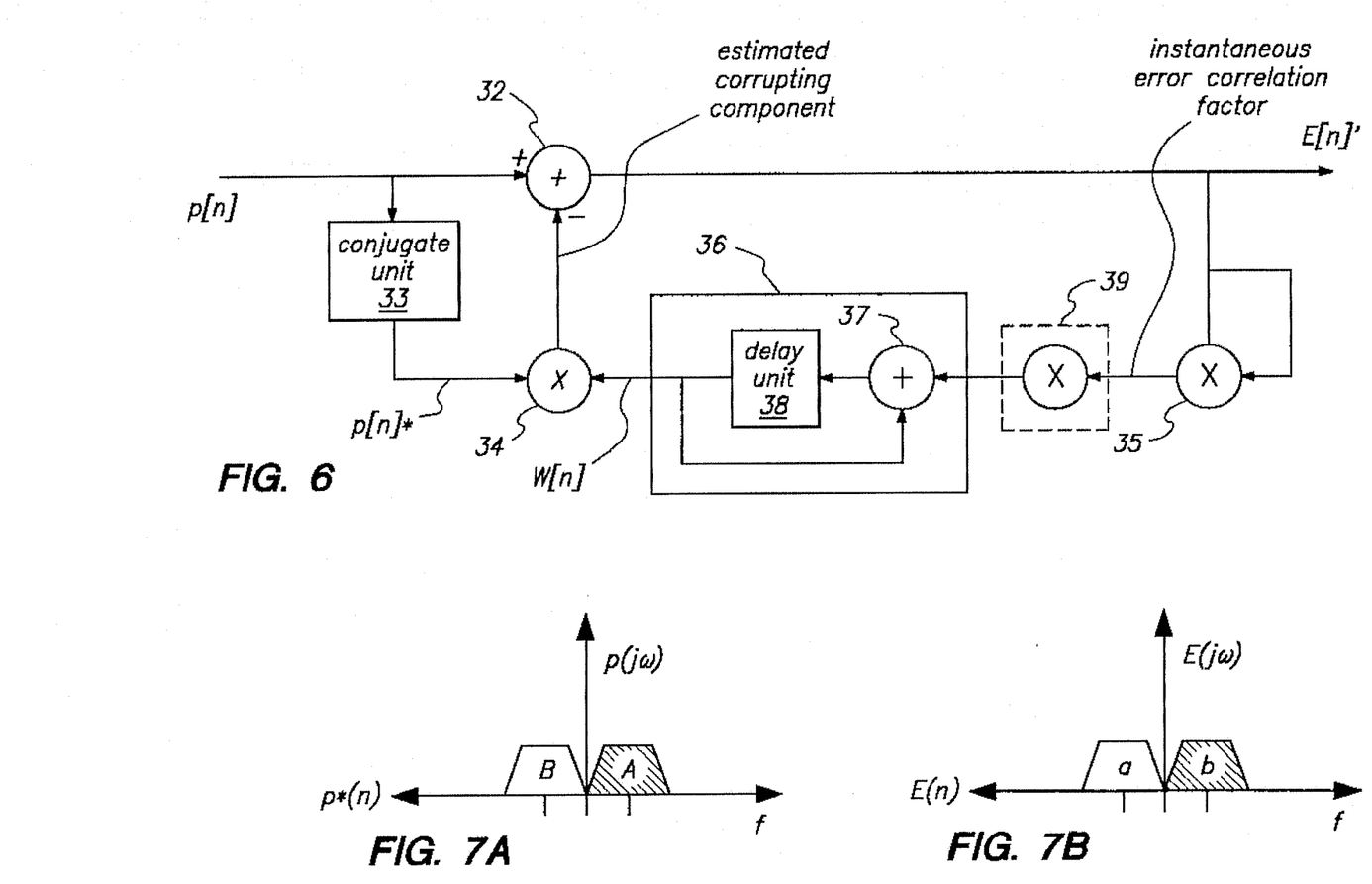
FIG. 6 illustrates a second embodiment of the present invention.
FIG. 7A illustrates signal p[n] shown in FIG. 5A after it has been passed through phase negating means 33 ( FIG. 6).
FIG. 7B illustrates signal p[n] after it has been decorrelated.

FIG. 6 illustrates another embodiment of the present invention which does not require initially shifting signal p[n] as described in the previous embodiment. As shown in FIG. 6, this embodiment includes first digital adder 32, phase negating means 33, first and second digital multipliers 34 and 35, and digital integrator 36 comprising second digital adder 37 and delay unit 38.

Figure 5A:
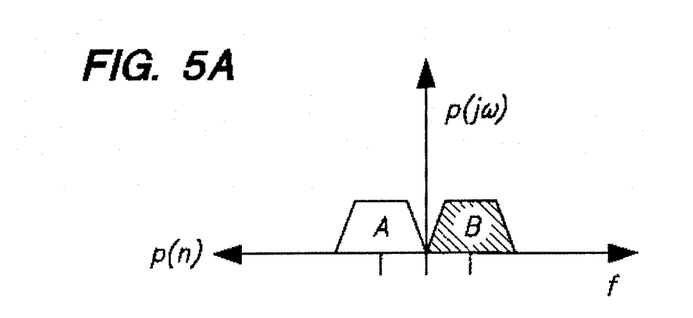
FIG. 5A illustrates a two-channel digital signal having first and second contaminated channels.
Figure 5B:
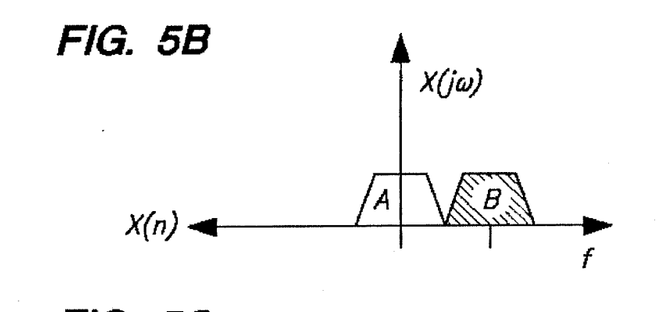
FIG. 5B illustrates the signal shown in FIG. 5A shifted such that the first channel is centered at zero frequency.
Figure 5C:
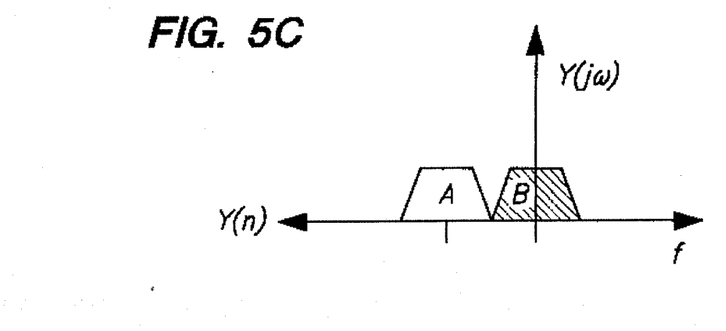
FIG. 5C illustrates the signal shown in FIG. 5A shifted such that the second channel is centered at zero frequency.
Figure 5D:
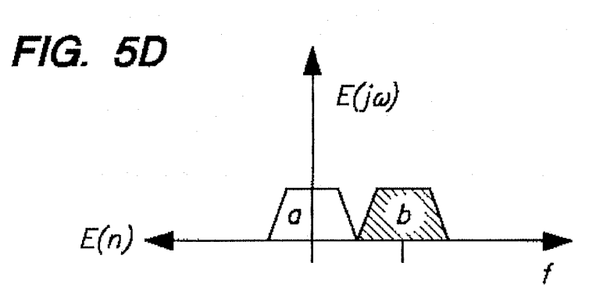
FIG. 5D illustrates the signal shown in FIG. 5B after it has been decorrelated.
Figure 5E:
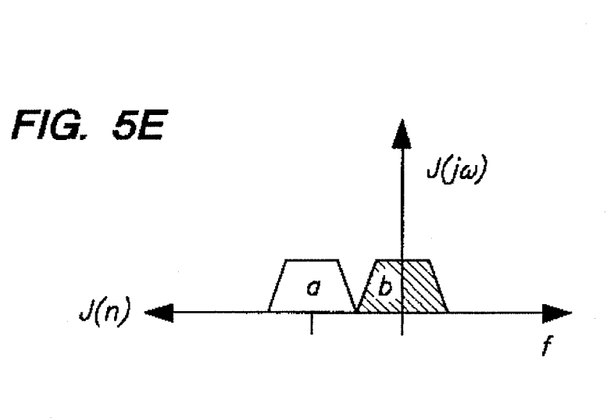
FIG. 5E illustrates the signal shown in FIG. 5C after it has been decorrelated.

Signal p[n] having corrupted channels A and B, (as shown in FIG. 5A), is coupled to the input of phase negating means 33 to generate signal p[n]* shown in FIG. 7A. Signal p[n]* is then coupled to first digital multiplier 34 along with the current average error correlation factor W[n] to produce an estimated corrupting component as indicated by equation 11.

$$\text{estimated corrupting component} = p[n]^* \times W[n] \qquad \text{eq. 11}$$

This estimated corrupting component is subtracted from the original corrupted signal p[n] by digital adder 32 to generate E[n]' as indicated by equation 12.

$$E[n]' = p[n] - p[n]^* \times W[n] \qquad \text{eq. 12}$$

where E[n]'=E[n] when each of channels A and B in signal p[n] are decorrelated from each other. FIG. 7B illustrates E[n] having decorrelated channels a and b.

The current average error correlation factor W[n] for this embodiment is determined by first digitally multiplying E[n] with itself, i.e. $E[n]^2$. As shown in FIG. 6, digital multiplier 35 digitally squares E[n] to generate the instantaneous error correlation factor. The output of digital multiplier 35 is coupled to digital integrator 36 which functions to sum the instantaneous error factor with the previous average error correlation factor (i.e. W[n–1]) to generate the current average error correlation factor (i.e. W[n]). As with the previous embodiment, digital integrator 36 can be implemented with digital adder 37 and delay unit 38 as shown in FIG. 6.

Also, FIG. 6 includes digital multiply unit 39 for weighting the instantaneous error correlation factor with weighting factor $2\mu$ as described above in connection with the embodiment shown in FIG. 4.

Although the elements of the present invention have been described in a conjunction with a certain embodiment, it is appreciated that the invention may be implemented in a variety of other ways. Consequently, it is to be understood that the particular embodiment shown and described by way of illustration are in no way intended to be considered limiting. Reference to the details of these embodiments is not intended to limit the scope of the claims which themselves recite only those features regarded as essential to the invention.

We claim:

1. An apparatus for decorrelating a multiple channel digital signal having at least one pair of mutually contaminated channels, said at least one pair including first and second mutually contaminated channels, said apparatus comprising:

a first means for generating a first signal by shifting said multi-channel signal such that said first contaminated channel is centered at a given frequency;

a second means for generating a second signal by shifting said multi-channel signal such that said second channel is centered at said given frequency;

a first means for negating the phase of said first signal to generate a first phase negated signal;

a second means for negating the phase of said second signal to generate a second phase negated signal;

a first means for digitally multiplying said first phase negated signal with a current average error correlation factor to generate a current first error corruption component;

a second means for digitally multiplying said second phase negated signal with said current average error correlation factor to generate a current second error corruption component;

a first means for subtracting said current first error corruption component from said second signal to generate a current second output signal;

a second means for subtracting said current second error corruption component from said first signal to generate a current first output signal;

a feedback means for generating said current average error correlation factor, said feedback means including means for multiplying said current first and second output signals to generate an instantaneous error correlation factor.

2. The apparatus as described in claim 1 wherein said feedback means also includes a summing means for summing said instantaneous error correlation factor with a previous average error correlation factor to generate said current average error correlation factor, said feedback means generating said instantaneous error correlation factor until said multi-channel signal is decorrelated 3. The apparatus as described in claim 2 wherein said means for multiplying said current first and second output signals also multiplies said instantaneous error correlation factor with a constant less than 1.

4. A method for decorrelating a multi-channel digital signal having at least one pair of mutually contaminated channels, said at least one pair including first and second mutually contaminated channels, said method comprising the steps of:

1) generating a first signal by shifting said multi-channel digital signal such that said first contaminated channel is centered at a given frequency;

2) generating a second signal by shifting said multi-channel digital signal such that said second contaminated channel is centered at said given frequency;

3) negating the phase of said first signal to generate a first phase negated signal;

4) negating the phase of said second signal to generate a second phase negated signal;

5) digitally multiplying said first phase negated signal with a current average error correlation factor to generate a current first error corruption component;

6) digitally multiplying said second phase negated signal with said current average error correlation factor to generate a current second error corruption component;

7) subtracting said current first error corruption component from said second signal to generate a current second output signal;

8) subtracting said current second error corruption component from said first signal to generate a current first output signal;

9) generating said current average error correlation factor by multiplying said current first and second output signals to generate an instantaneous error correlation factor;

10) repeating steps 5–10 until said first and second channels are decorrelated.

5. The method as described in claim 4 wherein after step 9 said instantaneous error correlation factor is summed with a previous average error correlation factor to generate said current average error correlation factor.

6. The method as described in claim 5 wherein said step of multiplying said current first and second output signals also includes the step for multiplying said instantaneous error correlation factor with a constant less than 1.

7. An apparatus for decorrelating a multi-channel digital signal having at least one pair of mutually contaminated channels, said at least one pair including first and second mutually contaminated channels, said apparatus comprising:

a means for negating the phase of said multi-channel digital signal to generate a phase negated signal;

a means for digitally multiplying said phase negated signal with a current average error correlation factor to generate a current error corruption component;

a means for subtracting said current error corruption component from said multi-channel digital signal to generate a current output signal;

a feedback means for generating said current average error correlation factor, said feedback means including means for multiplying said current output signal with itself to generate an instantaneous error correlation factor.

8. The apparatus as described in claim 7 wherein said feedback means also includes a summing means for summing said instantaneous error correlation factor with a previous average error correlation factor to generate said current average error correlation factor, said feedback means generating said instantaneous error correlation factor until said multi-channel signal is decorrelated.

9. The apparatus as described in claim 8 wherein said means for multiplying said current output signal with itself also functions to multiply said instantaneous error correlation factor with a constant less than 1.

10. A method for decorrelating a multi-channel digital signal having at least one pair of mutually contaminated channels, said at least one pair including first and second mutually contaminated channels, said method comprising the steps of:

1) negating the phase of said multi-channel digital signal to generate a phase negated signal;

2) digitally multiplying said phase negated signal with a current average error correlation factor to generate a current error corruption component;

3) subtracting said current error corruption component from said multi-channel digital signal to generate a current output signal;

4) generating said current average error correlation factor by feeding back said current output signal and multiplying it with itself to generate an instantaneous error correlation factor;

5) repeating steps 2–5 until said first and second channels are decorrelated.

11. The method as described in claim 10 wherein after step 4 said instantaneous error correlation factor is summed with a previous average error correlation factor to generate said current average error correlation factor.

12. The method as described in claim 11 wherein said instantaneous error correlation factor is also multiplied with a constant less than 1 before it is added to said previous average error correlation factor.

\* \* \* \* \*